United States Patent
Nagashima

(10) Patent No.: US 9,425,618 B2
(45) Date of Patent: Aug. 23, 2016

(54) POWER SUPPLY DEVICE, ELECTRICAL STORAGE DEVICE, ELECTRIC VEHICLE, AND ELECTRIC POWER SYSTEM CAPABLE OF SWITCHING BETWEEN PFC CONTROL AND MPPT CONTROL

(71) Applicant: Sony Corporation, Tokyo (JP)

(72) Inventor: Shun Nagashima, Fukushima (JP)

(73) Assignee: Sony Corporation, Tokyo (JP)

( * ) Notice: Subject to any disclaimer, the term of this patent is extended or adjusted under 35 U.S.C. 154(b) by 377 days.

(21) Appl. No.: 14/045,309

(22) Filed: Oct. 3, 2013

(65) Prior Publication Data

US 2014/0097669 A1 Apr. 10, 2014

(30) Foreign Application Priority Data

Oct. 10, 2012 (JP) ................................. 2012-225032

(51) Int. Cl.
*H02J 1/00* (2006.01)
*H02J 7/00* (2006.01)
(Continued)

(52) U.S. Cl.
CPC ............... *H02J 1/00* (2013.01); *B60L 11/1824* (2013.01); *H02J 7/0055* (2013.01); *H02J 7/35* (2013.01); *H02M 1/4225* (2013.01); *H02M 3/156* (2013.01); *B60L 2210/14* (2013.01); *B60L 2210/30* (2013.01); *B60L 2230/22* (2013.01); *B60L 2230/24* (2013.01); *B60L 2230/28* (2013.01); *G05F 1/67* (2013.01);
(Continued)

(58) Field of Classification Search
CPC ............. H02J 1/00; H02J 7/0055; H02J 7/35; H02M 1/4225; H02M 3/156; H02M 3/28; B60L 11/1824; B60L 2230/28; Y10T 307/68; Y10T 90/14; Y10T 90/121; Y10T 90/12; Y10T 10/7225; Y10T 10/7241; Y10T 90/127; Y10T 10/7005; Y10T 10/7088
USPC .......................................................... 307/72
See application file for complete search history.

(56) References Cited

U.S. PATENT DOCUMENTS 4,399,395 A * 8/1983 Espelage ............. H02M 5/4505
318/803
4,783,728 A * 11/1988 Hoffman ................. H02J 9/062
307/82

(Continued)

FOREIGN PATENT DOCUMENTS

JP 2009-284646 12/2009
JP 2009284646 A * 12/2009

*Primary Examiner* — Jared Fureman
*Assistant Examiner* — Michael Warmflash
(74) *Attorney, Agent, or Firm* — Chip Law Group

(57) ABSTRACT

A power supply device includes: an input determination section configured to determine which one of a commercial power supply and a power generator is an input power supply, and to generate a determination signal; a conversion section of a switching type configured to convert an input voltage into an output voltage; and a drive-signal generation section configured to be supplied with determination output from the input determination section, and to generate a switching drive signal for the conversion section, the drive-signal generation section being configured to serve as a power-factor correction control section and to generate the switching drive signal when the determination signal indicates that the commercial power supply is the input power supply, and being configured to serve as a maximum power point tracking control section and to generate the switching drive signal when the determination signal indicates that the power generator is the input power supply.

10 Claims, 17 Drawing Sheets

(51) Int. Cl.
*H02J 7/35* (2006.01)
*B60L 11/18* (2006.01)
*H02M 1/42* (2007.01)
*H02M 3/156* (2006.01)
*G05F 1/67* (2006.01)

(52) U.S. Cl.
CPC ......... *Y02T 10/7005* (2013.01); *Y02T 10/7088* (2013.01); *Y02T 10/7225* (2013.01); *Y02T 10/7241* (2013.01); *Y02T 90/12* (2013.01); *Y02T 90/121* (2013.01); *Y02T 90/127* (2013.01); *Y02T 90/14* (2013.01); *Y10T 307/68* (2015.04)

(56) References Cited

U.S. PATENT DOCUMENTS

| | | | | |
|---|---|---|---|---|
| 5,543,707 | A * | 8/1996 | Yoneyama | G01R 15/125 324/115 |
| 6,548,984 | B2 * | 4/2003 | Shamoto | H02M 7/53873 318/801 |
| 9,178,359 | B2 * | 11/2015 | Subramaniam | H02J 5/00 |
| 2010/0263711 | A1 * | 10/2010 | Kanai | G05F 1/67 136/246 |
| 2013/0308356 | A1 * | 11/2013 | Subramanium | H02J 5/00 363/53 |

* cited by examiner

EXAMPLE DETERMINED AS AC

EXAMPLE DETERMINED AS DC

POWER SUPPLY DEVICE, ELECTRICAL STORAGE DEVICE, ELECTRIC VEHICLE, AND ELECTRIC POWER SYSTEM CAPABLE OF SWITCHING BETWEEN PFC CONTROL AND MPPT CONTROL

CROSS REFERENCE TO RELATED APPLICATIONS

This application claims the benefit of Japanese Priority Patent Application JP 2012-225032 filed Oct. 10, 2012, the entire contents of which are incorporated herein by reference.

BACKGROUND

The present disclosure relates to a power supply device, an electrical storage device, an electric vehicle, and an electric power system, in which a DC power supply is formed from different types of input power supplies.

In recent years, research and development for use of renewable energy have been active with the aim of a departure from dependence on fossil fuel. Solar power generation, wind power generation, fuel cells, biomass power generation, wave power generation, and the like have been developed as power generation utilizing renewable energy. When renewable energy is utilized, there is such a disadvantage that power generation amount varies due to natural conditions, and deficiency and excess of power generation amount with respect to power consumption occur. For example, a domestic power consumption amount may increase during a specific time of day, but this specific time may not necessarily agree with the time when an amount of power generation is large.

In order to address this disadvantage, it is conceivable to introduce a battery system into each household. In this system, an output of solar power generation or the like is temporarily stored in the battery system, and an output of the battery system is used to match with consumption. Specifically, the followings are performed in this system. For example, electric power may be flattened by feeding the output of the battery system to a system during a power-consumption peak time. Further, time shifting may be performed such that electric power is stored during a time when an electricity rate is low, and the electric power is discharged and consumed during a time when the electricity rate is high. Furthermore, surplus power of electric power generated by an electrical generator such as a solar battery may be stored in the battery system.

A system in which power generation, power transformation, power transmission, and power distribution used to supply electric power to a power incoming unit of a consumer are integrated is called a power system (or a system). A flow of electric power from the consumer to the electric power system is called a reverse flow, and feeding the electric power from the consumer to the electric power system is called regeneration. For example, electric power generated in a solar power generation system may be supplied to an electric power company. In this case, usually, a power conditioner is provided for the solar power generation system. The power conditioner converts an unstable DC output voltage of a solar battery into a stable DC voltage, and further converts a DC voltage into an AC voltage. The power conditioner performs control to keep tracking a maximum power point, by following variation in electric power generated by the solar battery (Maximum Power Point Tracking (MPPT) control).

In a case in which the output of the solar power generation system is used as a charging power supply for the battery system, only generation of DC power supply may be necessary and thus, it is not necessary to convert a DC voltage into an AC voltage. However, the MPPT control is necessary in tracking the maximum power point of the solar battery. Further, it is conceivable to use a commercial power supply as the charging power supply of the battery system. For a case in which DC power supply is generated from the commercial power supply, a power supply device having a PFC (Power Factor Correction) control IC may be suitable. This type of power supply device is capable of suppressing generation of a harmonic by improving a power factor.

For example, in Japanese Unexamined Patent Application Publication No. 2009-284646 (JP2009-284646A), a DC input and an AC input are both used, which one of AC and DC is inputted is determined, and an output of the determination is supplied to a control circuit of a boost converter. The control circuit controls boosting in the boost converter and PFC based on a result of the determination.

SUMMARY

In JP 2009-284646A, determination of inputs of values that substantially have predetermined values is performed. For example, determination of AC of 100 V and DC of −48 V may be performed. Therefore, there is such a disadvantage that it is difficult to use this technique for determination of a DC input in a device in which a generated power (an output voltage) is varied as in a solar battery. Further, in the technique of JP 2009-284646A, the control circuit performs PFC control, but does not perform maximum power point tracking control (hereinafter, referred to as "MPPT control"). Furthermore, providing the power supply device for the PFC control and a circuit for the MPPT control separately brings disadvantages of enlarging a circuit scale and increasing the number of components.

It is desirable to provide a power supply device, an electrical storage device, an electric vehicle, and an electric power system, in which PFC control and MPPT control are both enabled and a circuit scale is small.

According to an embodiment of the present disclosure, there is provided a power supply device including:
  an input determination section configured to determine which one of a commercial power supply and a power generator is an input power supply, and to generate a determination signal;
  a conversion section of a switching type configured to convert an input voltage into an output voltage; and
  a drive-signal generation section configured to be supplied with determination output from the input determination section, and to generate a switching drive signal for the conversion section,
  the drive-signal generation section being configured to serve as a power-factor correction control section and to generate the switching drive signal when the determination signal indicates that the commercial power supply is the input power supply, and
  the drive-signal generation section being configured to serve as a maximum power point tracking control section and to generate the switching drive signal when the determination signal indicates that the power generator is the input power supply.

According to an embodiment of the present disclosure, there is provided an electrical storage device including:
  an input determination section configured to determine which one of a commercial power supply and a power generator is an input power supply, and to generate a determination signal;

a conversion section of a switching type configured to convert an input voltage into an output voltage; and a drive-signal generation section configured to be supplied with determination output from the input determination section, and to generate a switching drive signal for the conversion section, the drive-signal generation section being configured to serve as a power-factor correction control section and to generate the switching drive signal when the determination signal indicates that the commercial power supply is the input power supply, and the drive-signal generation section being configured to serve as a maximum power point tracking control section and to generate the switching drive signal when the determination signal indicates that the power generator is the input power supply; and an electrical storage section configured to serve as a load.

According to an embodiment of the present disclosure, there is provided an electric vehicle including an electrical storage device including an input determination section configured to determine which one of a commercial power supply and a power generator is an input power supply, and to generate a determination signal, a conversion section of a switching type configured to convert an input voltage into an output voltage, and a drive-signal generation section configured to be supplied with determination output from the input determination section, and to generate a switching drive signal for the conversion section, the drive-signal generation section being configured to serve as a power-factor correction control section and to generate the switching drive signal when the determination signal indicates that the commercial power supply is the input power supply, and the drive-signal generation section being configured to serve as a maximum power point tracking control section and to generate the switching drive signal when the determination signal indicates that the power generator is the input power supply, and an electrical storage section configured to serve as a load.

According to an embodiment of the present disclosure, there is provided an electric power system including an electrical storage device including an input determination section configured to determine which one of a commercial power supply and a power generator is an input power supply, and to generate a determination signal, a conversion section of a switching type configured to convert an input voltage into an output voltage, and a drive-signal generation section configured to be supplied with determination output from the input determination section, and to generate a switching drive signal for the conversion section, the drive-signal generation section being configured to serve as a power-factor correction control section and to generate the switching drive signal when the determination signal indicates that the commercial power supply is the input power supply, and the drive-signal generation section being configured to serve as a maximum power point tracking control section and to generate the switching drive signal when the determination signal indicates that the power generator is the input power supply, and an electrical storage section configured to serve as a load.

According to the above-described embodiments of the present disclosure, the power supply device that is capable of performing switching between PFC control and MPPT control depending on an input power supply and has a simple circuit configuration is allowed to be provided.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the present disclosure, and are incorporated in and constitute a part of this specification. The drawings illustrate embodiments and, together with the specification, serve to describe the principles of the technology.

DETAILED DESCRIPTION

Some embodiments to be described below are preferable specific examples of the embodiments of the present disclosure, and various kinds of technically-preferable limitation may be applied thereto. However, the scope of the present disclosure is not limited to these embodiments in the following description, unless there is description of limiting the present disclosure in particular. The following description will be provided in an order shown below.

1. Overall Configuration
2. Input Determination Section
3. PFC Control
4. MPPT Control
5. Embodiment
6. Another Embodiment
7. Application Examples
8. Modifications

[1. Overall Configuration]

Figure 1:
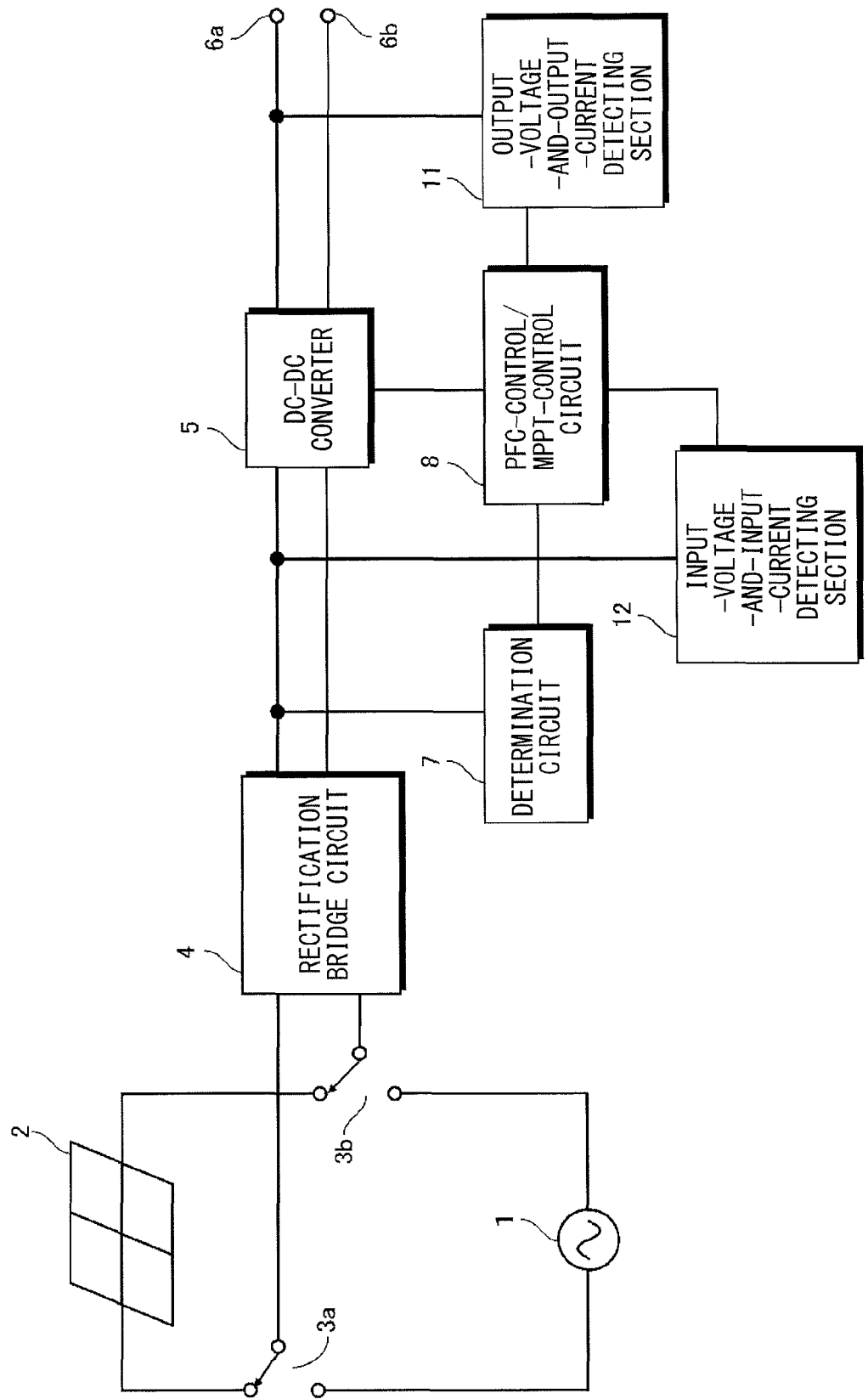
FIG. 1 is a block diagram illustrating an example of an overall configuration according to an embodiment of the present disclosure.

An example of an overall configuration of a power supply device according to an embodiment of the present disclosure will be described with reference to FIG. 1. In this system, switching between a commercial power supply 1 and a solar battery 2 is allowed to be performed. The solar battery 2 converts solar energy into electrical energy. In the solar battery 2, a plurality of solar battery cells are connected in series to form modules, the plurality of modules are connected in series to form strings, and the plurality of strings are connected in parallel to form a unit of array. A power generator such as a fuel cell, a wind power generator, and a biomass power generator may be used in place of the solar battery 2. The commercial power supply 1 will be referred to as "AC", and an output of the solar battery 2 will be referred to as "DC", as appropriate.

An output of either the commercial power supply 1 or the solar battery 2 selected by switching circuits 3a and 3b is supplied to a rectification bridge circuit 4. The switching circuits 3a and 3b are controlled by switching signals supplied from a not-illustrated control circuit. For example, in a case in which a load is an electrical storage device, use of either the commercial power supply 1 or the solar battery 2 as a power supply of charging the electrical storage device is determined by switching depending on the situation.

The rectification bridge circuit 4 operates as a full-wave rectifier circuit. An output of the rectification bridge circuit 4 is supplied to a DC-DC converter section 5. The DC-DC converter section 5 is a switching power supply circuit of a boost type that may convert, for example, an input DC voltage into a higher output DC voltage. To the DC-DC converter section 5, output terminals 6a and 6b are connected.

A load, for example, an electrical storage device, may be connected to the output terminals 6a and 6b, and the electrical storage device is charged by output power supply. The electrical storage device may be a device in which a large number of electrical storage elements, for example, battery cells such as lithium ion secondary batteries, are used to produce high output. The battery cells are divided into a plurality of electrical storage units, and a control device is provided as a device common to the plurality of electrical storage units. Examples of the electrical storage element may include a capacitor, besides the secondary battery such as the lithium ion secondary battery. Further, a load of a type different from the electrical storage element may be connected to the output terminals 6a and 6b.

A determination circuit 7 that determines the type of an input is connected to the output of the rectification bridge circuit 4. A distinguishing output signal is supplied from the determination circuit 7 to a PFC-control/MPPT-control circuit 8, as a control signal. The PFC-control/MPPT-control circuit 8 is a circuit configured by integrating a PFC control circuit and an MPPT control circuit into an IC (Integrated Circuit). To the PFC-control/MPPT-control circuit 8, an output voltage and an output current are supplied from an output-voltage-and-output-current detecting section 11, and an input voltage and an input current are also supplied from an input-voltage-and-input-current detecting section 12.

Figure 2:
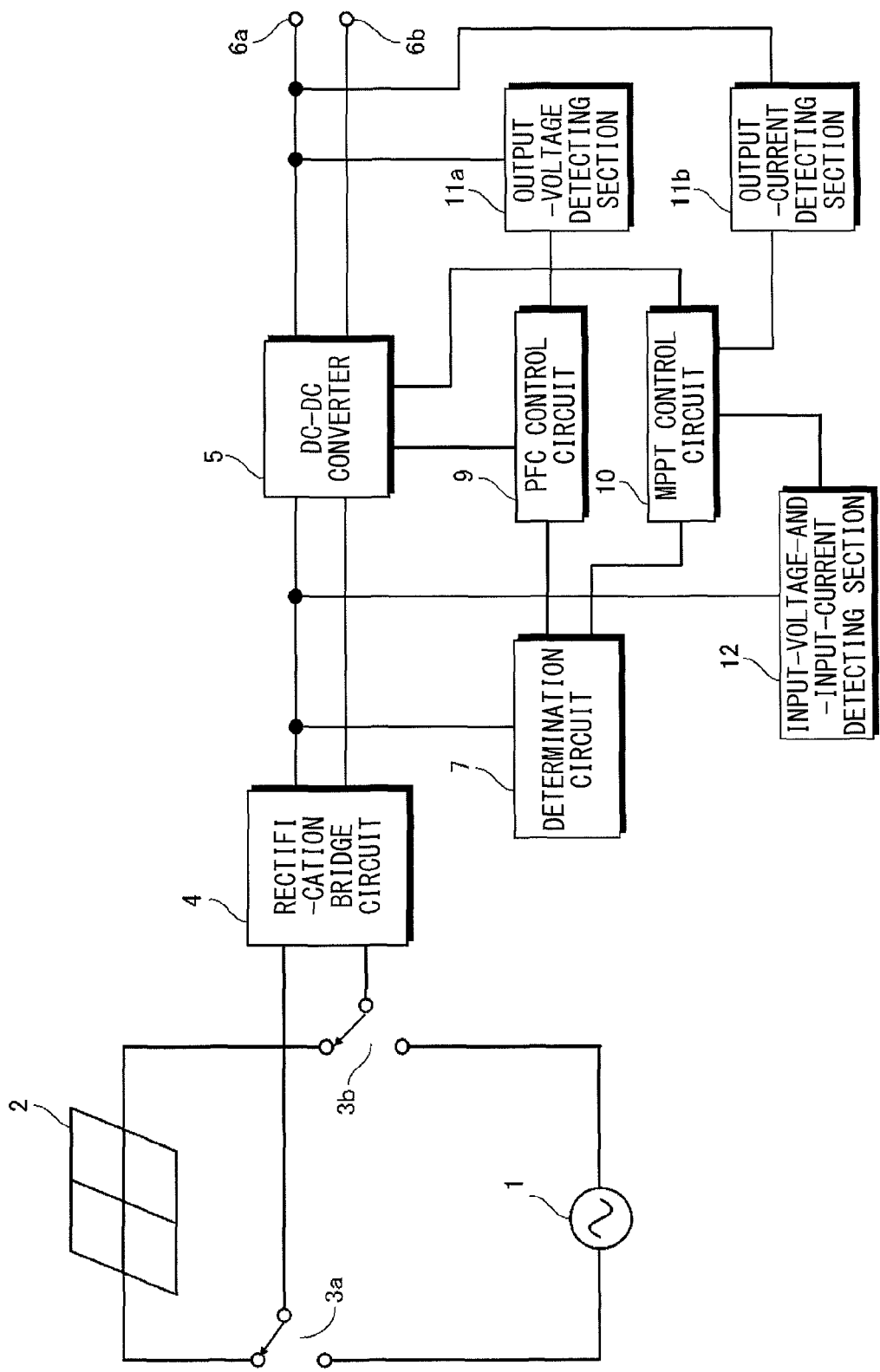
FIG. 2 is a block diagram illustrating another example of an overall configuration according to an embodiment of the present disclosure.

As illustrated in FIG. 2, a configuration in which the control circuit is divided into a PFC control circuit 9 and an MPPT control circuit 10 may be provided. To the PFC control circuit 9, an output voltage to be extracted by the output terminals 6a and 6b is supplied from an output-voltage detecting section 11a. To the MPPT control circuit 10, an input current and an input voltage detected by the input-voltage-and-input-current detecting section 12, as well as an output current detected by the output-current detecting section 11b are supplied. In other words, the MPPT control circuit 10 detects electric power outputted from the solar battery 2.

A determination result is supplied from the determination circuit 7 to the PFC-control/MPPT-control circuit 8 (the configuration in FIG. 1) or to the PFC control circuit 9 and the MPPT control circuit 10 (the configuration in FIG. 2). When the determination result indicates that the commercial power supply 1 is an input power supply, a switching drive signal for the PFC control is supplied to the DC-DC converter section 5. On the other hand, when the determination result indicates that the solar battery 2 is an input power supply, a switching drive signal for the MPPT control is supplied to the DC-DC converter section 5.

(2. Input Determination Section)

Figure 3:
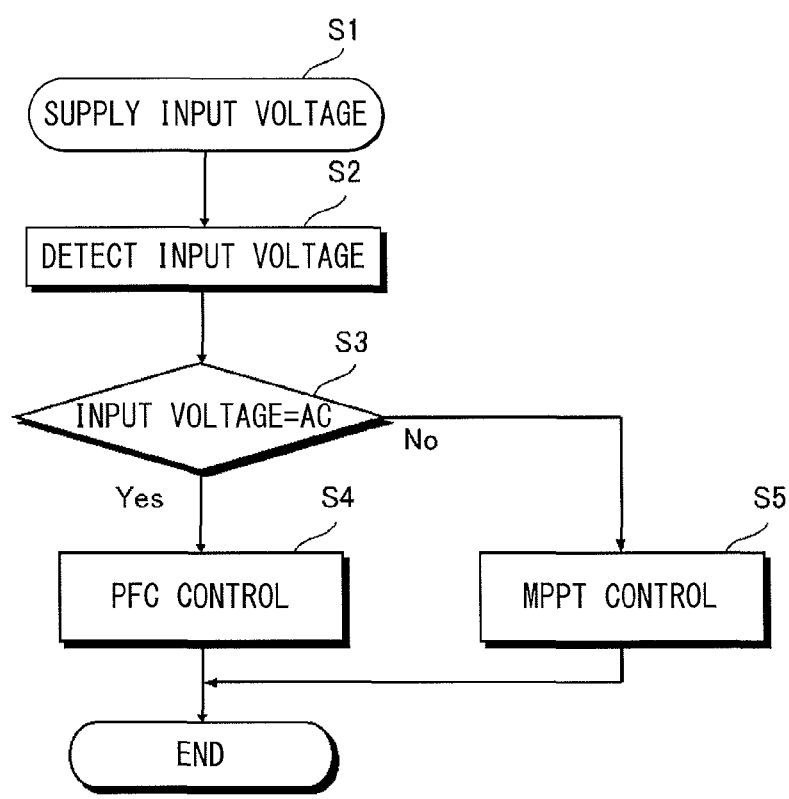
FIG. 3 is a flowchart illustrating a flow of operation according to an embodiment of the present disclosure.

In an embodiment according to the present disclosure, operation as illustrated in a flowchart of FIG. 3 is performed.

Step S1: an input voltage is supplied.
Step S2: an input voltage is detected.
Step S3: whether or not the detected input voltage is provided by the commercial power supply 1 (AC input) is determined.
Step S4: when a determination result in step S3 indicates the commercial power supply 1, the PFC control is performed.
Step S5: when the determination result in step S3 indicates an output of the solar battery 2 (DC input), the MPPT control is performed.

An AC-line signal detecting device which has been proposed (see, Japanese Unexamined Patent Application Publication No. 2010-261862) may be used for determination processing in step S3. This device is capable of precisely detecting discontinuation of power supply from an AC line, based on a waveform abnormality of an AC line signal. When discontinuation of the supply of AC from the AC line signal is detected, it is determined that an output (DC) of the solar battery 2 is supplied. Determination operation of the determination circuit 7 may be performed constantly.

Figure 4:
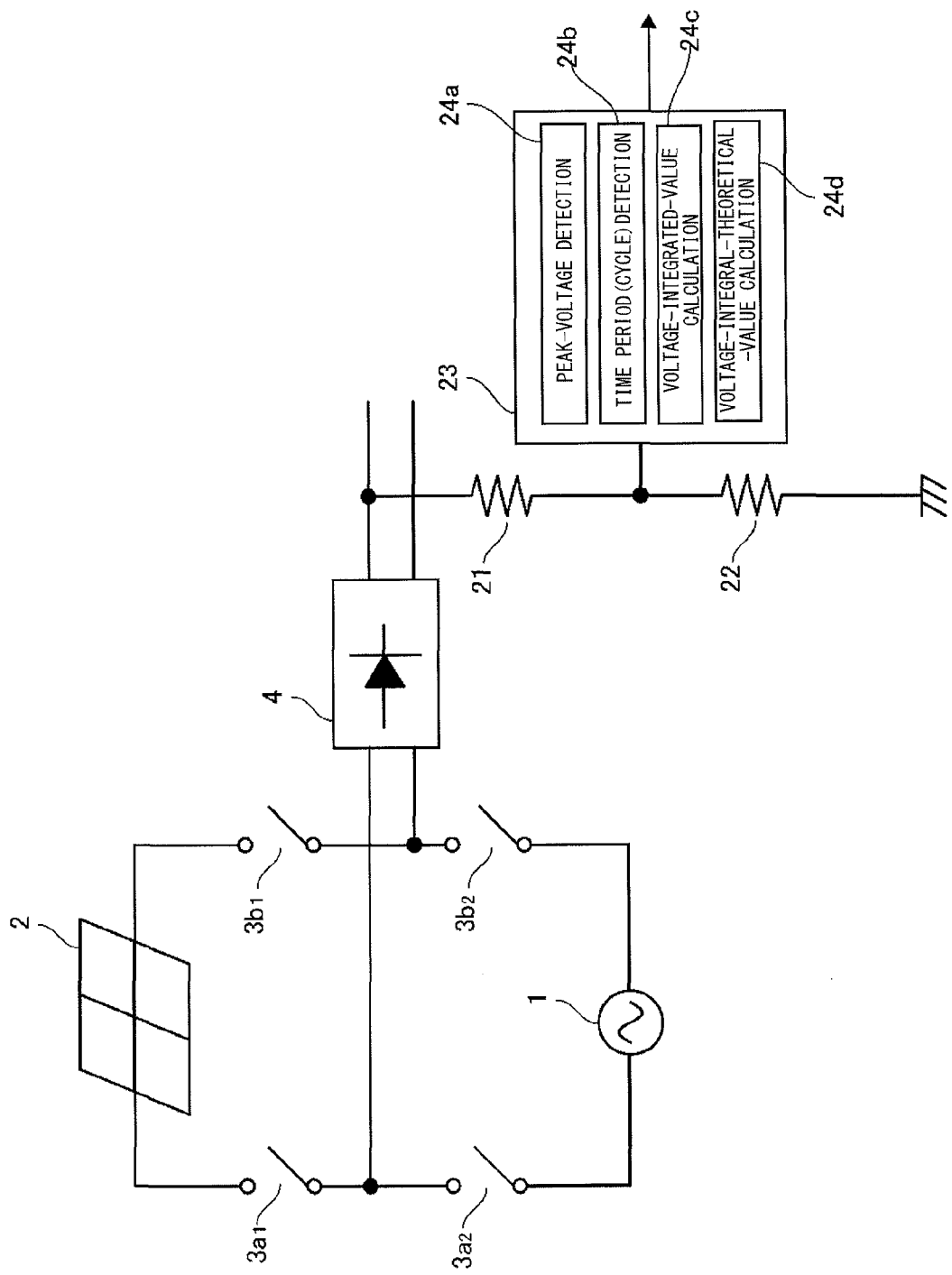
FIG. 4 is a block diagram illustrating an example of a determination circuit according to an embodiment of the present disclosure.

The determination circuit 7 configured differently from the above-described existing determination circuit is illustrated in FIG. 4. One of output terminals of the rectification bridge circuit 4 is grounded through a resistance 21 and a resistance 22. A voltage of a connecting point between the resistances 21 and 22 is supplied to a microcomputer 23. The microcomputer 23 digitizes an input voltage that has been subjected to voltage division by resistance, through use of an A/D converter, thereby obtaining a digital input voltage. The digital input voltage is then subjected to the following processing, and a determination result is outputted. Switching between the PFC control and the MPPT control is performed according to this determination result.

Peak-voltage detection processing 24a: a time period T1 and a time period T2 are measured. The time period T1 is a time period in which a voltage V is varied from 0 V to peak voltage Vp, and the time period T2 is a time period in which the voltage V is varied from the peak voltage Vp to 0 V for the next time.

Time (period) detection processing 24b: a cycle T (=T1+T2) is determined.

Voltage-integrated-value calculation processing 24c: a voltage integrated value Sa of the period of the cycle T is calculated.

Voltage-integral-theoretical-value calculation processing 24d: a voltage integral theoretical value Sb of a half cycle of a sine-wave having a half cycle T and a peak voltage Vp are calculated with the use of a program.

Figure 5A:
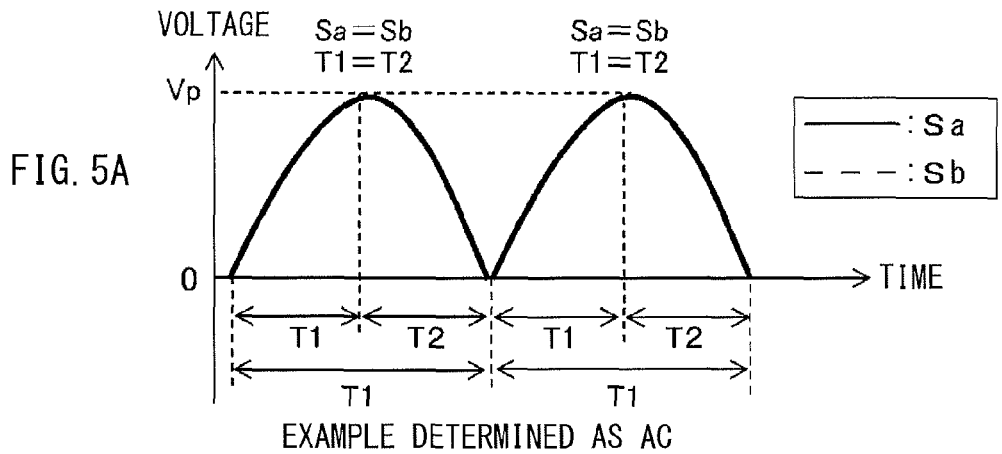
FIGS. 5A and 5B are waveform charts used to describe the determination circuit.
Figure 5B:
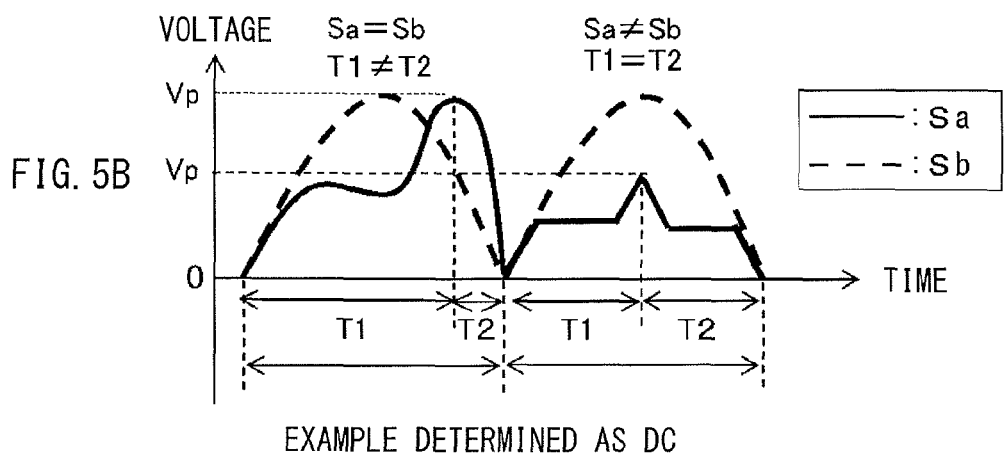

Determination processing in the microcomputer 23 will be described with reference to FIG. 5A, FIG. 5B, and FIG. 6. FIG. 5A illustrates an example of a waveform determined as an output voltage waveform of the rectification bridge circuit 4 when the output of the commercial power supply 1 (AC) is inputted. FIG. 5B illustrates an example of a waveform determined as an output voltage waveform of the rectification bridge circuit 4 when the output (DC) of the solar battery 2 is inputted.

Figure 6:
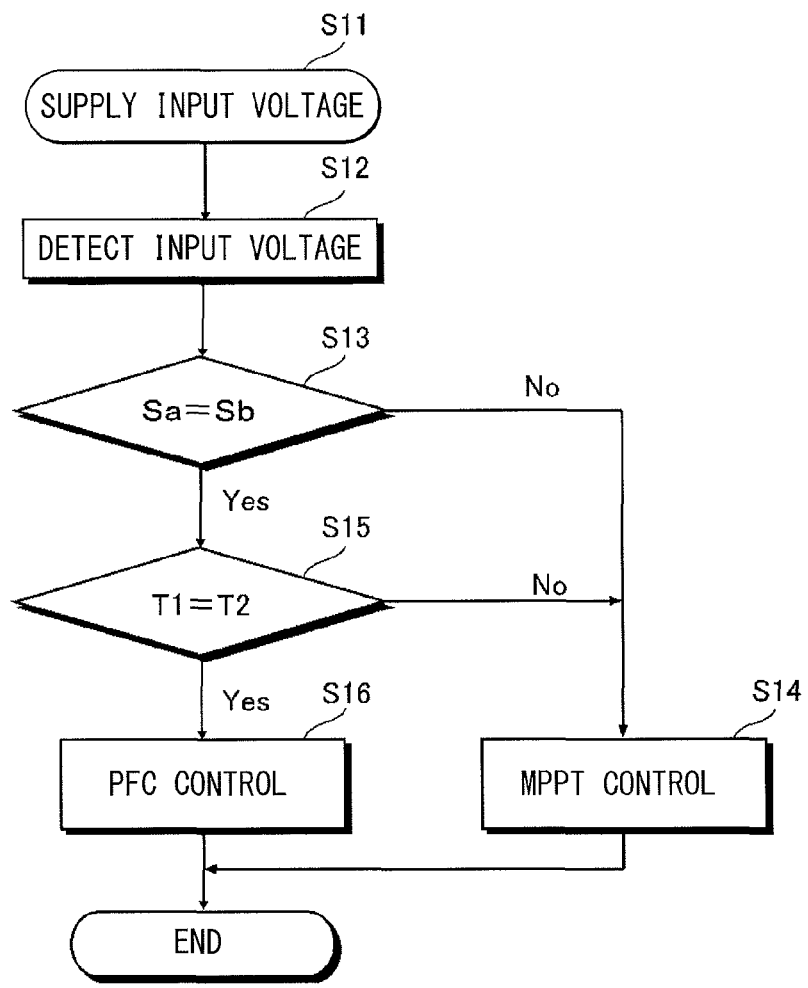
FIG. 6 is a flowchart used to describe the determination circuit.

The microcomputer 23 performs the determination processing as illustrated in a flowchart of FIG. 6.

Step S11: an input voltage is supplied.

Step S12: the input voltage is detected.

Step S13: the voltage integrated value Sa and the voltage integral theoretical value Sb are each calculated to determine whether or not (Sa=Sb) is established. When (Sa=Sb) is not established, it is determined that the input is not provided by the commercial power supply 1 (AC).

Step S14: when it is determined that the input is not provided by the commercial power supply 1 (AC) in step S13, the MPPT control is performed.

Step S15: when it is determined that (Sa=Sb) is established in step S13, whether or not (T1=T2) is established is determined. When it is determined that (T1=T2) is not established in step S15, the MPPT control is performed (step S14).

Step S16: when it is determined that (T1=T2) is established in step S15, it is determined that the input is provided by the commercial power supply 1 (AC), and the PFC control is performed.

As for the waveform illustrated in FIG. 5A, (Sa=Sb) and (T1=T2) are established for both of two consecutive waveforms of a full-wave rectification waveform and thus, it is determined that the input is provided by the commercial power supply 1. As for the waveform illustrated in FIG. 5B, a first waveform of two consecutive waveforms of a full-wave rectification waveform indicates (Sa=Sb) and (T1≠T2) and thus, it is determined that the input is not provided by the commercial power supply 1. A second waveform thereof indicates (T1=T2) and (Sa≠Sb) and thus, it is determined that the input is not provided by the commercial power supply 1.

In this way, in the determination circuit 7 having the configuration illustrated in FIG. 4, precise determination is allowed to be performed because the type of the input is determined based on variation with time of a full-wave rectification waveform. In addition, the determination circuit 7 determines whether or not the input is provided from the commercial power supply by comparing an output waveform of a full-wave rectifier circuit with a sinusoidal waveform, and thus is allowed to perform precise determination. For example, even in a case of two inputs in which the respective peak voltages Vp are substantially equal to each other, precise determination is allowed. It is to be noted that a final determination result may be obtained at the time when the same determination result successively occurs for a predetermined number of times in the determination operation.

[3. PFC Control]

Figure 7:
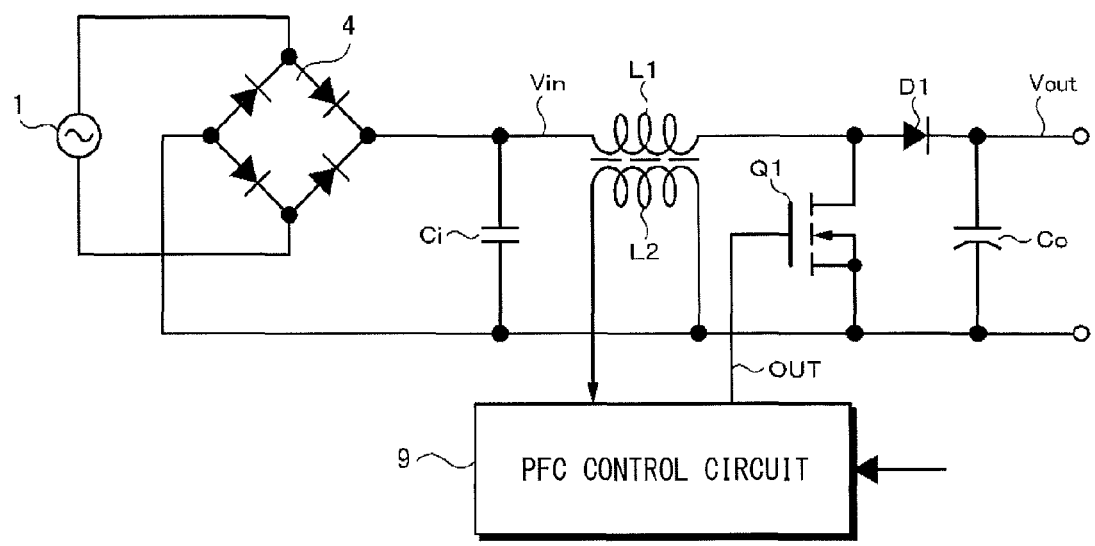
FIG. 7 is a connection diagram illustrating an example of a power supply circuit for PFC control.

Two types of PFC control modes are known; a critical mode and a current continuous mode (hereinafter, referred to as "continuous mode"). In the present disclosure, the PFC control in either mode may be used. An example of a power supply device having a PFC control circuit in the critical mode will be described with reference to FIG. 7. As illustrated in FIG. 7, the rectification bridge circuit 4 rectifies an AC voltage of an AC power supply (commercial power supply) 1, and supplies a full-wave rectification voltage to a smoothing capacitor Ci. An input (direct current) voltage Vin is outputted to both ends of the smoothing capacitor Ci.

One output terminal (on an ungrounded side) of the rectification bridge circuit 4 is connected to one end of a choke coil L1, and the other end of the choke coil L1 is connected to one output terminal through a diode D1. Between a connecting point, which is provided between the other end of the choke coil L1 and the diode D1, and the other output terminal, a drain of an FET (Field Effect Transistor) Q1 serving as a switching element is connected. For example, the FET Q1 may be an n-channel-type FET. A source of the FET Q1 is grounded.

As a secondary winding of the choke coil L1, a detecting coil L2 is connected. The detecting coil L2 is provided to detect a current flowing through the choke coil L1 becoming zero. An output signal of the detecting coil L2 is supplied to the PFC control circuit 9. A drive pulse (a switching drive signal) OUT formed by the PFC control circuit 9 is supplied to a gate of the FET Q1.

The drain of the FET Q1 is connected to one end of a capacitor Co through the diode D1 in a forward direction. The other end of the capacitor Co is grounded. An output voltage Vout is generated at the both ends of the capacitor Co. The output voltage Vout is applied to a load (not illustrated). For example, the load may be an electrical storage device. The choke coil L1, the detecting coil L2, the FET Q1, the diode D1, and the capacitor Co configure the DC-DC converter section 5 in FIG. 1 or FIG. 2.

The DC-DC converter section of a boost type is configured, and an output voltage Vout higher than an input voltage Vin is formed. The FET Q1 is turned off in a time period when a logical value of the drive pulse OUT is in a low level (hereinafter, written as "L"), and is turned on in a time period when the logical value is in a high level (hereinafter, written as "H").

In the time period when the FET Q1 is turned on, a current flows through the choke coil L1 and the FET Q1. Next, when the FET Q1 is turned off, a current flows through the choke coil L1, the diode D1, and the capacitor Co. The current flowing through the choke coil L1 becoming zero is detected by the detecting coil L2, and the drive pulse OUT that turns on the FET Q1 is outputted by the PFC control circuit 9 immediately after this detection.

An output voltage is supplied to the PFC control circuit 9, and controlled to be a predetermined voltage. In other words, the drive pulse is a PFM signal, and such control that when a load increases, the value of the output voltage is decreased and the frequency of the drive pulse is lowered to extend an ON period of the FET Q1 is performed.

Figure 8A:
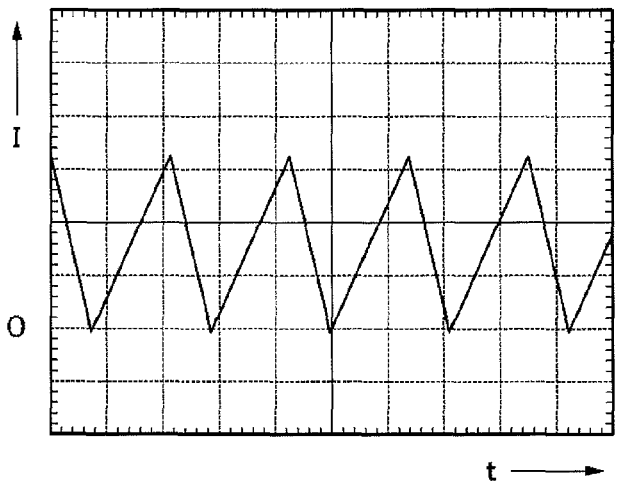
FIGS. 8A and 8B are waveform charts used to describe the example of the power supply circuit for PFC control.
Figure 8B:
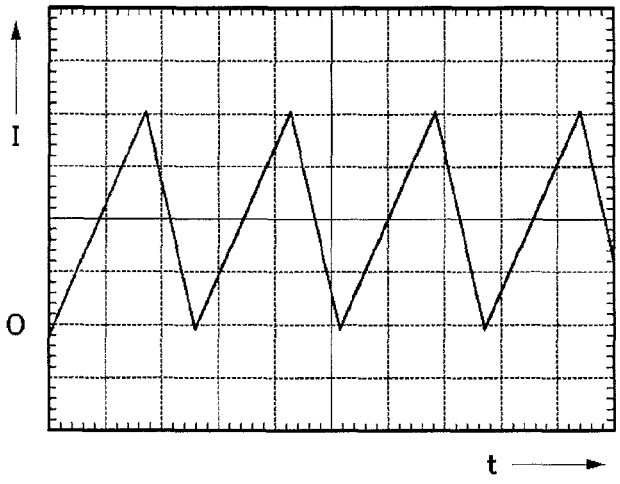

FIGS. 8A and 8B each illustrate a waveform of a current flowing through the choke coil L1 in the critical mode. The peak value of a current becomes a value proportional to the length of the ON period of the FET Q1 and to the input voltage Vin, and also becomes a value inversely proportional to an inductance component of the choke coil L1. When a load increases for the current waveform illustrated in FIG. 8A, this current waveform then becomes the current waveform illustrated in FIG. 8B. In other words, as the load increases, the peak value of the current increases and the frequency decreases. In the case of the critical mode, there is such a disadvantage that, when the load increases, the peak value of the current flowing through the choke coil L1 increases as described above, and thus, this case is not suitable for high power uses.

Figure 9:
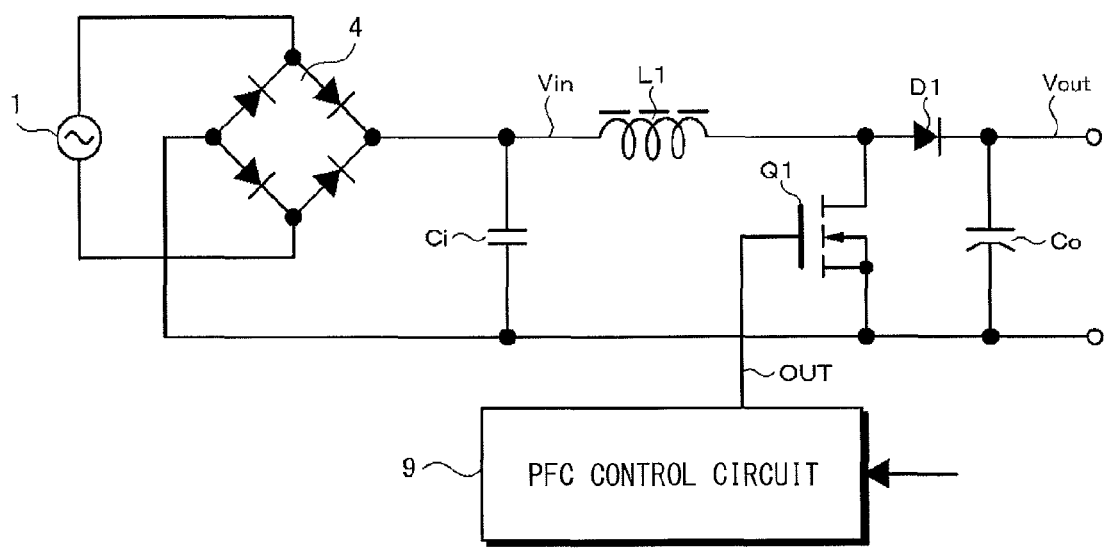
FIG. 9 is a connection diagram illustrating another example of the power supply circuit for PFC control.

Next, the continuous mode will be described with reference to FIG. 9. The PFC control circuit 9 in the continuous mode has an oscillator of a fixed frequency, and generates a drive pulse OUT of a fixed frequency. The drive pulse OUT is supplied to the gate of the FET Q1. As with the critical mode, the peak value of a current becomes a value proportional to the length of the ON period of the FET Q1 and the input voltage Vin, and also becomes a value inversely proportional to an inductance component of the choke coil L1. In the continuous mode, the output frequency is assumed to be a fixed value determined depending on the oscillator.

Figure 10A:
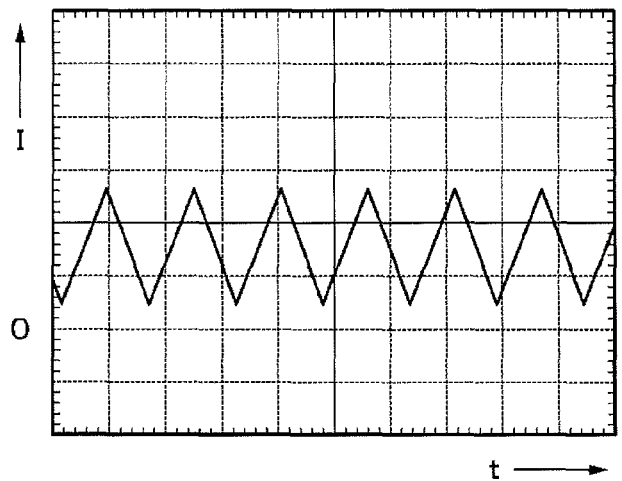
FIGS. 10A and 10B are waveform charts used to describe the another example of the power supply circuit for PFC control.
Figure 10B:
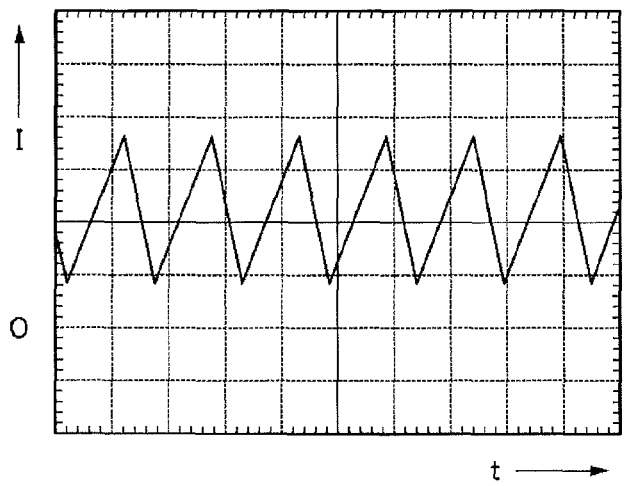

In the continuous mode, the FET Q1 performs switching operation based on the drive pulse OUT of the fixed frequency, and therefore, a current flowing through the choke coil L1 does not become zero as illustrated in FIGS. 10A and 10B. A current waveform when a load increases for a current waveform in FIG. 10A is illustrated in FIG. 10B. When the load increases, control of increasing the ON duty of the drive pulse, and extending the ON period of the FET Q1 is performed. In the continuous mode, the peak value of the current is suppressed as compared with that in the critical mode and thus, the continuous mode is suitable for high-power uses.

Figure 11A:
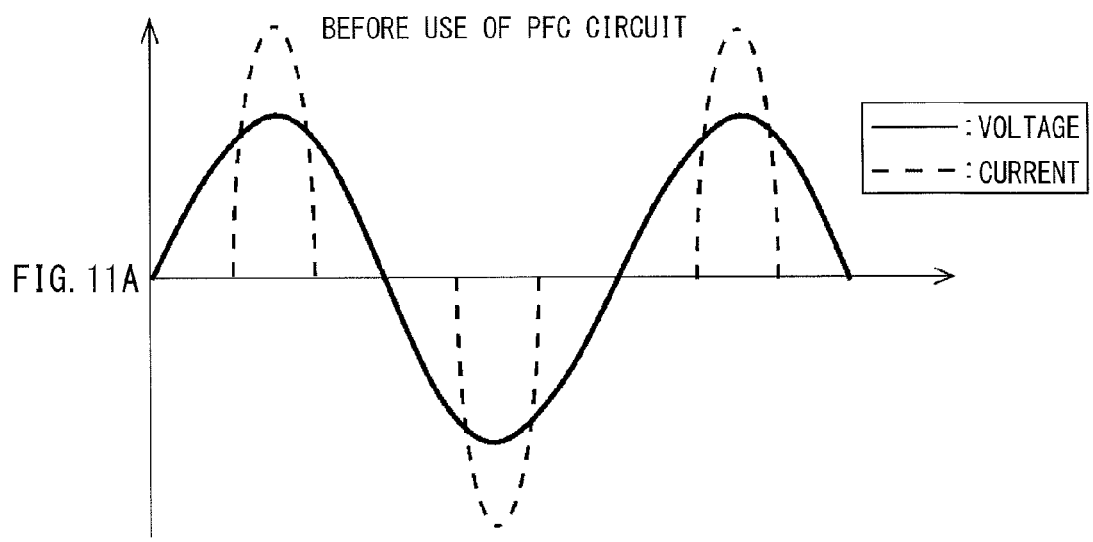
FIGS. 11A and 11B are waveform charts used to describe PFC control.

In a case of switching power supply, a current waveform (a broken line) is a pointed waveform whereas a voltage waveform is sinusoidal, as illustrated in FIG. 11A. In this current waveform, a conduction time is short, a peak value is high, and a frequency is an integral multiple of a fundamental wave. Therefore, disadvantages such as flowing of a harmonic current, a voltage crest value not becoming a normal value, and a rise in current peak value may occur.

Figure 11B:
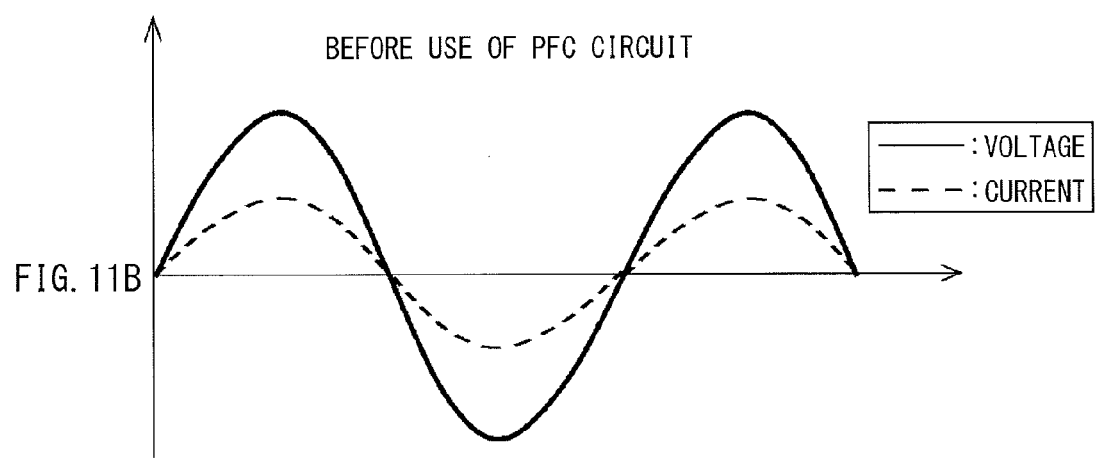

Various kinds of disadvantages may occur because of an undesirable power factor as described above and thus, a PFC circuit is used. The PFC circuit lowers the peak value of a current waveform to expand the current waveform, as illustrated in FIG. 11B. As a result, the power factor is corrected, and occurrence of the disadvantages described above is allowed to be prevented.

[4. MPPT Control]

In the case of the solar battery 2, there may be such a disadvantage that an output voltage is varied due to a current actually necessary for a connected electrical storage device (a load), and only electric power lower than rated output power is allowed to be extracted. In order to address this advantage, the DC-DC converter section 5 of the MPPT control is provided between the solar battery 2 and the load. In other words, in the MPPT control, an electrical operating point of the solar battery is controlled to be adjusted by varying an output current, to secure maximum electric power generation under a certain condition.

Figure 12:
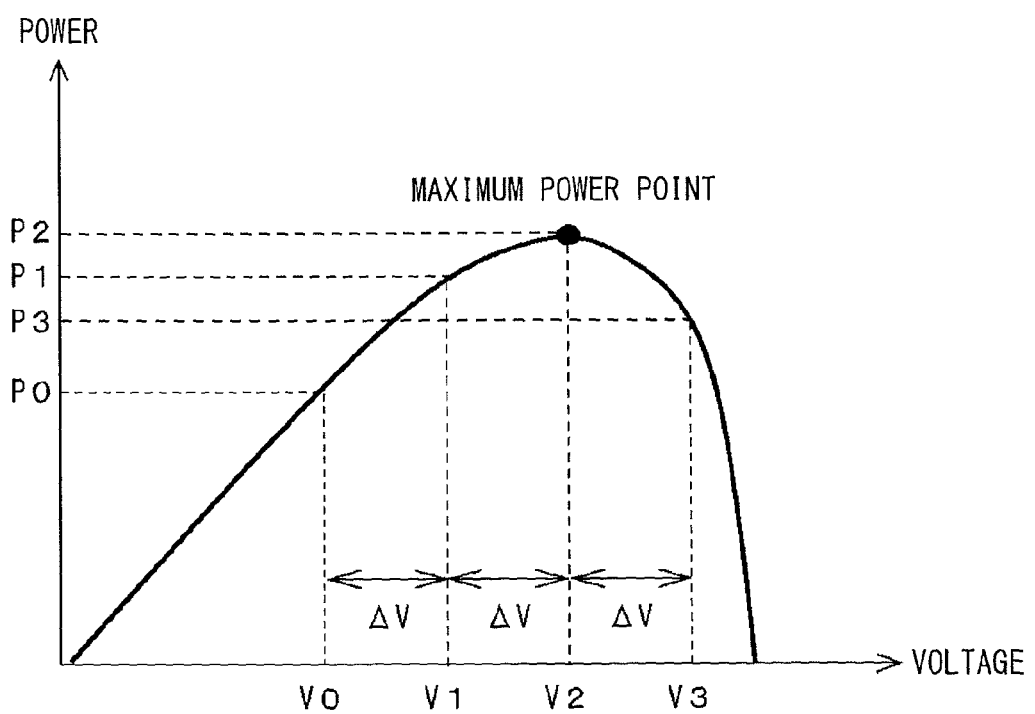
FIG. 12 is a schematic diagram used to describe MPPT control.

The solar battery 2 has a P-V curve (a Power-Voltage curve) illustrated in FIG. 12. In an output voltage V2, the P-V curve is in a maximum state. In other words, electric power allowed to be extracted from a solar battery PV is maximized by causing the output voltage to be V2. The MPPT control operates to maximize the electric power allowed to be extracted from the solar battery 2. One of methods to realize the MPPT control is a hill-climbing method.

The hill-climbing method will be described with reference to FIG. 12. Assume that, at the time of starting control, voltage is V0 and electric power is P0. First, only the voltage is increased by ΔV to be V1. Electric power P1 at the voltage V1 is larger than P0 and thus, the voltage is further increased by ΔV to be V2, without changing the sign of ΔV. Electric power P2 at the voltage V2 is larger than P1 and thus, the voltage is further increased by ΔV to be V3, without changing the sign of ΔV. Electric power P3 at the voltage V3 is smaller than P2 and thus, the voltage is decreased by ΔV to be V2, by reversing the sign of ΔV. Thereafter, until the P-V curve is varied due to variation in climatic condition or the like, the sign of ΔV is reversed every time the voltage reaches V1 and V3, so that the voltage swings between V1 and V3.

[5. Embodiment]

Figure 13:
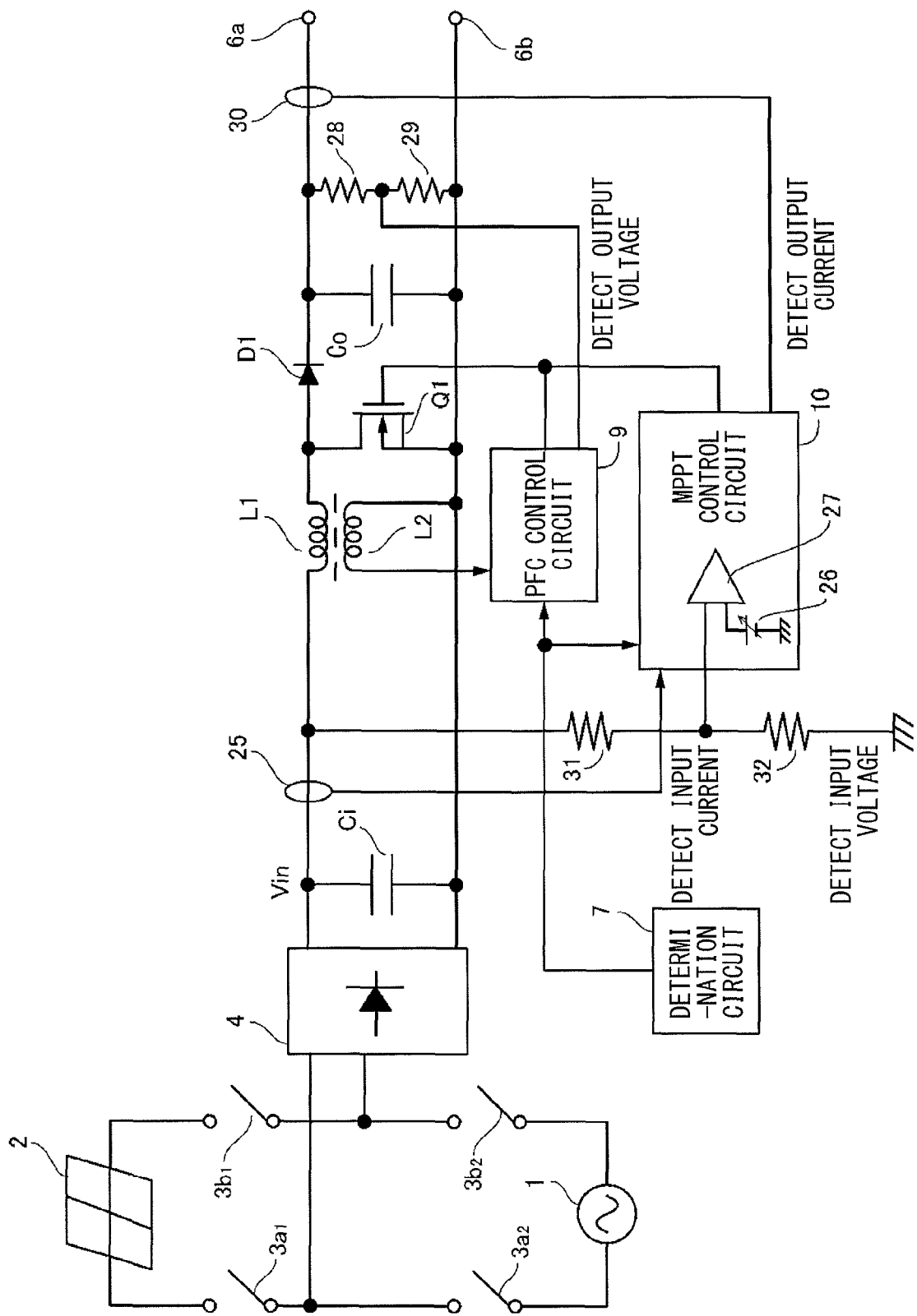
FIG. 13 is a connection diagram according to an embodiment of the present disclosure.

FIG. 13 illustrates an embodiment of the present disclosure. In this embodiment of the present disclosure, switching between the commercial power supply 1 and the solar battery 2 is performed by switching circuits 3a1, 3a2, 3b1, and 3b2. These switching circuits 3a1, 3a2, 3b1, and 3b2 are controlled by switching signals provided by a control circuit (not illustrated). For example, in a case in which a load is an electrical storage device, use of either the commercial power supply 1 or the solar battery 2 as a power supply for charging the electrical storage device may be determined by the switching.

Output of selected one of either the commercial power supply 1 or the solar battery 2 is supplied to the rectification bridge circuit 4. The rectification bridge circuit 4 supplies a full-wave rectification voltage to the smoothing capacitor Ci, by rectifying the inputted power. An input (direct current) voltage Vin is outputted to both ends of the smoothing capacitor Ci.

One output terminal (on an ungrounded side) of the rectification bridge circuit 4 is connected to one end of the choke coil L1, and the other end of the choke coil L1 is connected to one output terminal through the diode D1. Between the connecting point, which is provided between the other end of the choke coil L1 and the diode D1, and the other output terminal, the drain of the FET (Field Effect Transistor) Q1 serving as a switching element is connected. The FET Q1 may be, for example, an n-channel-type FET. A source of the FET Q1 is grounded.

As a secondary winding of the choke coil L1, a detecting coil L2 is connected. The detecting coil L2 is provided to detect a current flowing through the choke coil L1 becoming zero. An output signal of the detecting coil L2 is supplied to the PFC control circuit 9. A drive pulse (a switching drive signal) OUT formed by the PFC control circuit 9 or the MPPT control circuit 10 is supplied to a gate of the FET Q1.

The drain of the FET Q1 is connected to one end of the capacitor Co through the diode D1 in a forward direction. The other end of the capacitor Co is grounded. An output voltage Vout is generated at the both ends of the capacitor Co. The output voltage Vout is applied to a load (not illustrated). For example, the load may be an electrical storage device. The choke coil L1, the detecting coil L2, the FET Q1, the diode D1, and the capacitor Co configure the DC-DC converter section 5 in FIG. 1 or FIG. 2.

The FET Q1 is turned off in a time period when a logical value of the drive pulse OUT is in a low level (hereinafter, written as "L"), and is turned on in a time period when the logical value is in a high level (hereinafter, written as "H"). In the time period when the FET Q1 is turned on, a current flows through the choke coil L1 and the FET Q1. Next, when the FET Q1 is turned off, a current flows through the choke coil L1, the diode D1, and the capacitor Co. The current flowing through the choke coil L1 becoming zero is detected by the detecting coil L2, and the drive pulse OUT that turns on the FET Q1 is outputted by the PFC control circuit 9 immediately after this detection.

An output voltage divided by a resistance 28 and a resistance 29 is supplied to the PFC control circuit 9, and controlled to be a predetermined voltage. In other words, the drive pulse is a PFM signal, and such control that, when a load increases, the value of the output voltage is decreased and the frequency of the drive pulse is lowered to extend an ON period of the FET Q1 is performed. It is to be noted that the DC-DC converter section in the continuous mode illustrated in FIG. 9 may be used.

A load, for example, an electrical storage device, may be connected to the output terminals 6a and 6b, and the electrical storage device may be charged with output power supply. As the electrical storage element, a capacitor may be used, besides a secondary battery such as a lithium ion secondary battery. Further, a load of a type different from the electrical storage element may be connected to the output terminals 6a and 6b.

The determination circuit 7 that determines the type of an input is connected to an output of the rectification bridge circuit 4. A voltage divided by a resistance 31 and a resistance 32 is supplied to the determination circuit 7. This voltage is obtained by dividing the output voltage (input voltage) of the rectification bridge circuit 4. A determination output signal is supplied from the determination circuit 7 to the PFC control circuit 9 and the MPPT control circuit 10, as a control signal. It is to be noted that the PFC-control/MPPT-control circuit 8 in which a PFC control circuit and an MPPT control circuit are integrated into an IC may be used.

An input current detected by a current sensor 25 is supplied to the MPPT control circuit 10. Further, a voltage extracted from a connection point between the resistance 31 and the resistance 32 is supplied to the MPPT control circuit 10. The MPPT control circuit 10 includes an arithmetic amplifier 27 to which the input voltage and a voltage from a variable voltage supply 26 are supplied for MPPT control. The variable voltage supply 26 and the arithmetic amplifier 27 configure an input-voltage varying section that varies a voltage by $\Delta V$. The MPPT control circuit 10 further includes a microcomputer to which an output of the arithmetic amplifier 27 is supplied. Furthermore, an output current detected by a current sensor 30 is supplied to the MPPT control circuit 10.

When the detected input current and an output voltage of the input-voltage varying section are supplied to the microcomputer of the MPPT control circuit 10, control based on the above-described hill-climbing method is performed according to a program of the microcomputer. The MPPT control circuit 10 generates a drive pulse that is to produce a desirable output voltage at the output terminals 6a and 6b, and supplies the generated drive pulse to the FET Q1. In this way, one of the drive pulse formed in the PFC control circuit 9 and the drive pulse formed in the MPPT control circuit 10, corresponding to the input power supply, is supplied to the gate of the FET Q1.

As illustrated in FIG. 13, the configuration of a part corresponding to the DC-DC converter is shared by the PFC control and the MPPT control. Thus, there is such an advantage that a circuit scale may be reduced as compared with a configuration in which DC-DC converters are provided separately.

[6. Another Embodiment]

Figure 14:
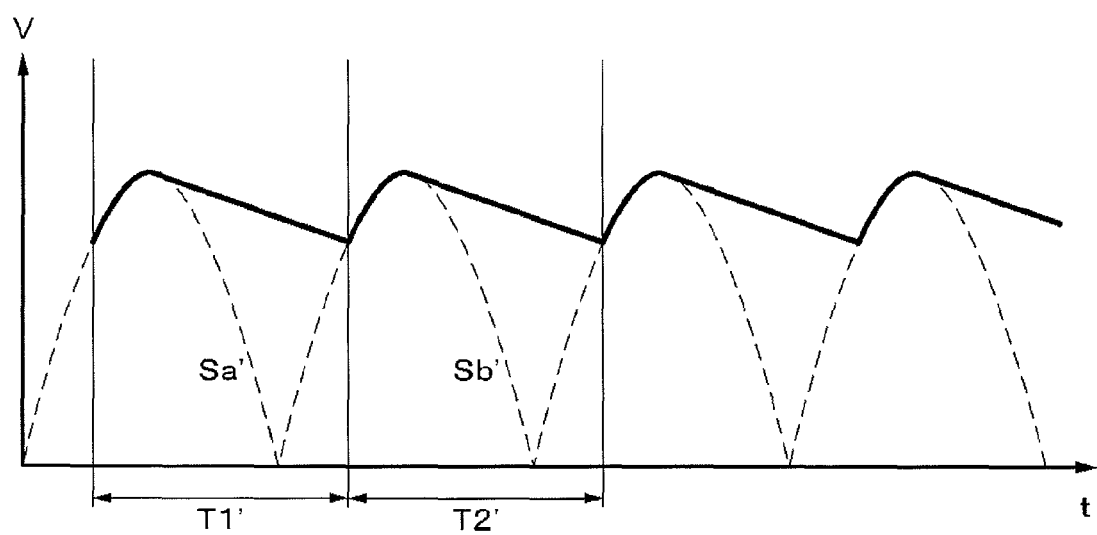
FIG. 14 is a waveform chart used to describe another embodiment of the present disclosure.

In the above-described configuration illustrated in FIG. 13, the smoothing capacitor Ci is connected. Therefore, a pulsating flow in which ripples remain as illustrated in FIG. 14 occurs, that is, a waveform is different from that illustrated in FIG. 5. Even in this case, whether or not the input is provided by the commercial power supply is determined based on whether (Sa'=Sb') and (T1'=T2') are established, in a manner similar to that of the above-described determination processing.

Figure 15:
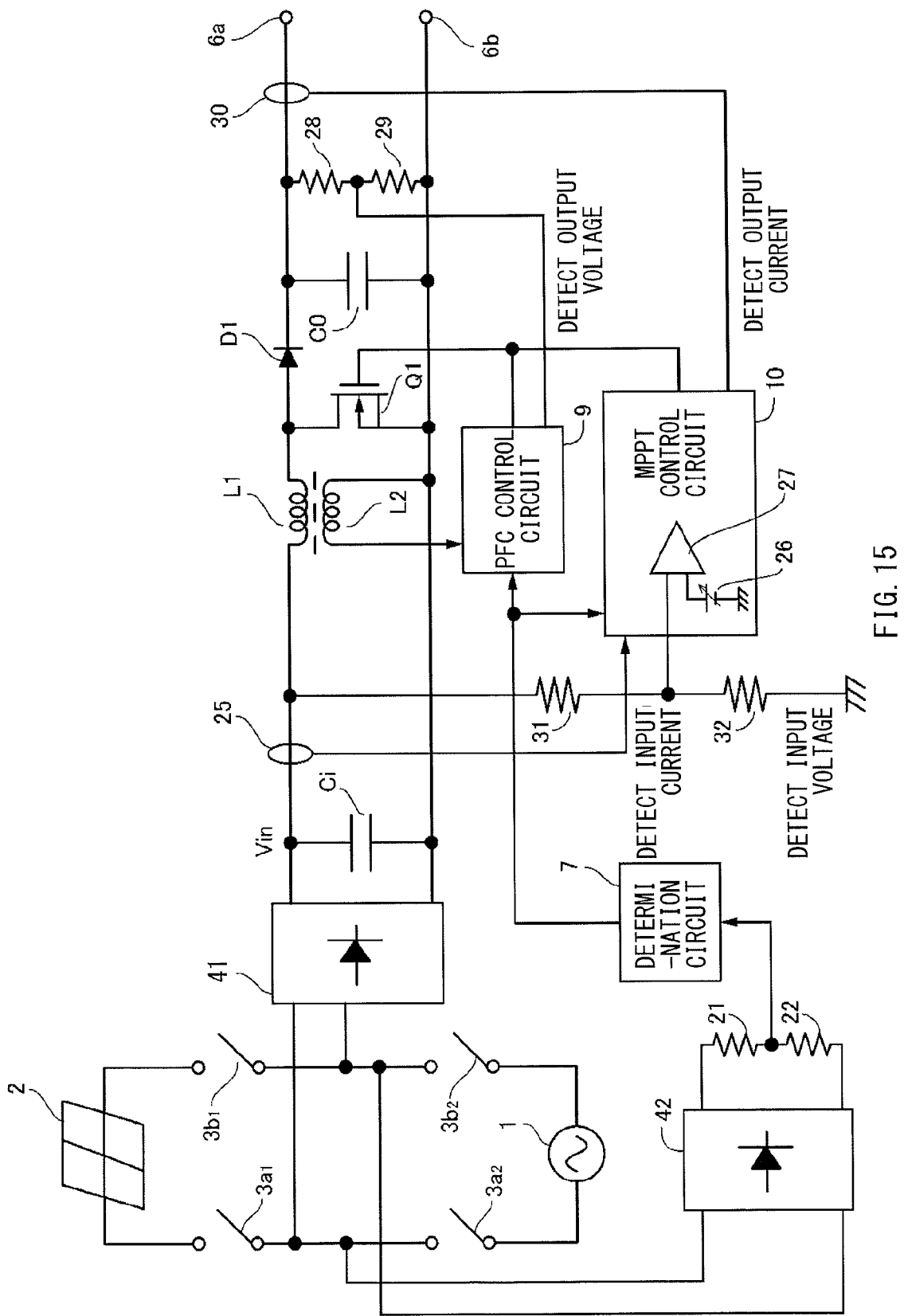
FIG. 15 is a connection diagram of the another embodiment of the present disclosure.

Considering this point, in this another embodiment of the present disclosure, a rectification bridge circuit 42 is provided separately from a rectification bridge circuit 41 to which the smoothing capacitor Ci is connected, as illustrated in FIG. 15. In other words, the resistance 21 and the resistance 22 that are connected in series are connected to an output of the rectification bridge circuit 42, and a voltage of a connecting point between these resistances 21 and 22 is supplied to the determination circuit 7. A resistance 31 and a resistance 32 that are connected in series are connected to an output of the rectification bridge circuit 41, and a voltage of a connecting point between these resistances 31 and 32 is supplied to the MPPT control circuit 10. In this configuration illustrated in FIG. 15, the smoothing capacitor is not connected to the output of the rectification bridge circuit 42, and therefore, a voltage having the waveform illustrated in FIG. 5 is supplied to the determination circuit 7.

[7. Application Examples]

[Power Storage System in House as Application Example]

Figure 16:
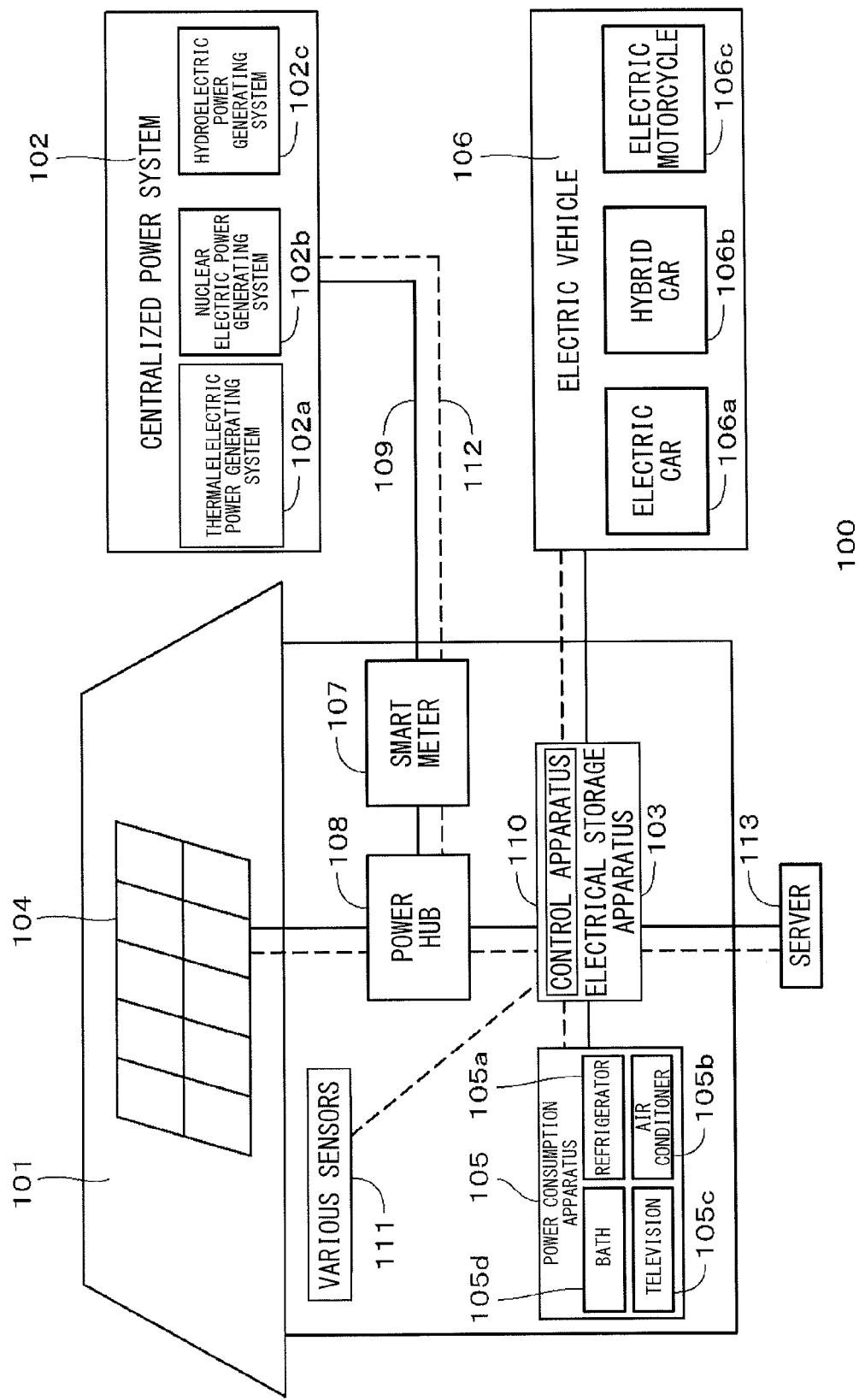
FIG. 16 is a block diagram illustrating a first example of an application of the power supply device according to any of the embodiments of the present disclosure.

An example in which any of the embodiments of the present disclosure is applied to a power storage system in a house will be described with reference to FIG. 16. For example, in a power storage system 100 for a house 101, electric power may be supplied to an electrical storage apparatus 103, from a centralized power system 102 such as a thermal power generation system 102a, a nuclear power generation system 102b, and a hydraulic power generation system 102c, through a power network 109, an information network 112, a smart meter 107, a power hub 108, and the like. Besides, electric power is supplied from an independent power supply such as a home power generator 104 to the electrical storage apparatus 103. The electric power supplied to the electrical storage apparatus 103 is stored. Using the electrical storage apparatus 103, the electric power to be used in the house 101 is supplied. Applications are not limited to the house 101, and a similar power storage system may be also used in a building.

The house 101 is provided with the power generator 104, a power consuming apparatus 105, the electrical storage apparatus 103, a control apparatus 110 controlling each apparatus, the smart meter 107, and sensors 111 acquiring various kinds of information. Each apparatus is connected by the power network 109 and the information network 112. Examples of the power generator 104 may include a solar battery, a fuel cell, and the like, and the electric power generated thereby is supplied to the power consuming apparatus 105 and/or the electrical storage apparatus 103. The power consuming apparatus 105 may be any of a refrigerator 105a, an air conditioner 105b, a television receiver 105c, a bath 105d, and the like. Further, an electric vehicle 106 may also be an example of the power consuming apparatus 105. The electric vehicle 106 may be any of an electric car 106a, a hybrid car 106b, an electric motorcycle 106c, and the like.

The power supply device according to any of the above-described embodiments of the present disclosure is applied as a power supply used to charge the electrical storage apparatus 103. The electrical storage apparatus 103 is configured using a secondary battery or a capacitor. For example, the electrical storage apparatus 103 may be configured using a lithium ion battery. The lithium ion battery may be of either a stationary type or a type used in the electric vehicle 106. The smart meter 107 has a function of measuring the amount of consumed commercial electric power, and transmitting the measured amount to an electric power company. The power network 109 may be any one of or a combination of direct current feeding, alternate-current feeding, and non-contact feeding.

For example, the various sensors 111 may include a motion sensor, an illumination sensor, an object detection sensor, a power consumption sensor, a vibration sensor, a tactile sensor, a temperature sensor, an infrared sensor, and the like. Information acquired by the various sensors 111 is transmitted to the control apparatus 110. The power consuming apparatus 105 is automatically controlled based on a meteorological state, the state of a person, and the like that are recognized using the information provided by the sensors 111, so that energy consumption is minimized. Further, the control apparatus 110 is capable of transmitting information about the house 101 to an outside electric power company and the like, through the Internet.

The power hub 108 performs power line divergence, DC-AC conversion, and the like. Examples of a communication scheme of the information network 112 connected to the control device 110 may include a method using a communication interface such as UART (Universal Asynchronous Receiver-Transceiver), and a method utilizing a sensor network based on a wireless communication standard such as Bluetooth (registered trademark), ZigBee, and Wi-Fi. Bluetooth (registered trademark) scheme is applied to multimedia communication, and is capable of performing communication through one-to-many connections. ZigBee uses a physical layer of IEEE (Institute of Electrical and Electronics Engineers) 802.15.4. This IEEE 802.15.4 is a name of a short-range wireless network standard called PAN (Personal Area Network) or WPAN (Wireless PAN).

The control apparatus 110 is connected to a server 113 provided outside. The server 113 may be managed by any of the house 101, the electric power company, and a service provider. Information transmitted and received by the server 113 may be, for example, power consumption information, life pattern information, electric power rate, weather information, natural disaster information, and information about electric power transaction. These pieces of information may be transmitted and received by the power consuming device (such as a television receiver) inside the home, but may be transmitted and received by a device (such as a portable telephone) outside the home. These pieces of information may be displayed on a device having a display function, such as a television receiver, a portable telephone, and a PDA (Personal Digital Assistant).

The control apparatus 110 controlling each section includes a CPU (Central Processing Unit), RAM (Random Access Memory), ROM (Read Only Memory), and the like, and is stored in the electrical storage apparatus 103 in this example. The control apparatus 110 is connected to the electrical storage apparatus 103, the home power generator 104, the power consuming apparatus 105, the various sensors 111, and the server 113, through the information network 112. The control apparatus 110 may have, for example, a function of adjusting the amount of consumed commercial electric power and the amount of generated electric power. It is to be noted that the control apparatus 110 may have other functions such as a function of performing electric power transactions on a power market.

As described above, not only the power generated by the centralized power system 102 such as the thermal power generation system 102a, the nuclear power generation system 102b, and the hydraulic power generation system 102c, but also the power generated by the home power generator 104 (such as a solar power generator and a wind power generator) is allowed to be stored in the electrical storage device 103. Therefore, it may be possible, for example, to keep the amount of power to be sent outside constant even when the power generated by the home power generator 104 is varied, or to perform control of discharging a necessary amount of power. For example, it is possible to adopt such usage that, while the electric power obtained by solar power generation is stored in the electrical storage apparatus 103, midnight electric power is stored in the electrical storage apparatus 103 at night when the rate is low, and the electric power stored in the electrical storage apparatus 103 is discharged and utilized during daytime hours when the rate is high.

It is to be noted that, in this example, the example in which the control apparatus 110 is stored in the electrical storage apparatus 103 has been described, but the control apparatus 110 may be stored in the smart meter 107 or may be configured independently. Further, the power storage system 100 may be used for a plurality of households in apartment complex housing or may be used for a plurality of single-family houses.

[Power Storage System in Vehicle as Application Example]

Figure 17:
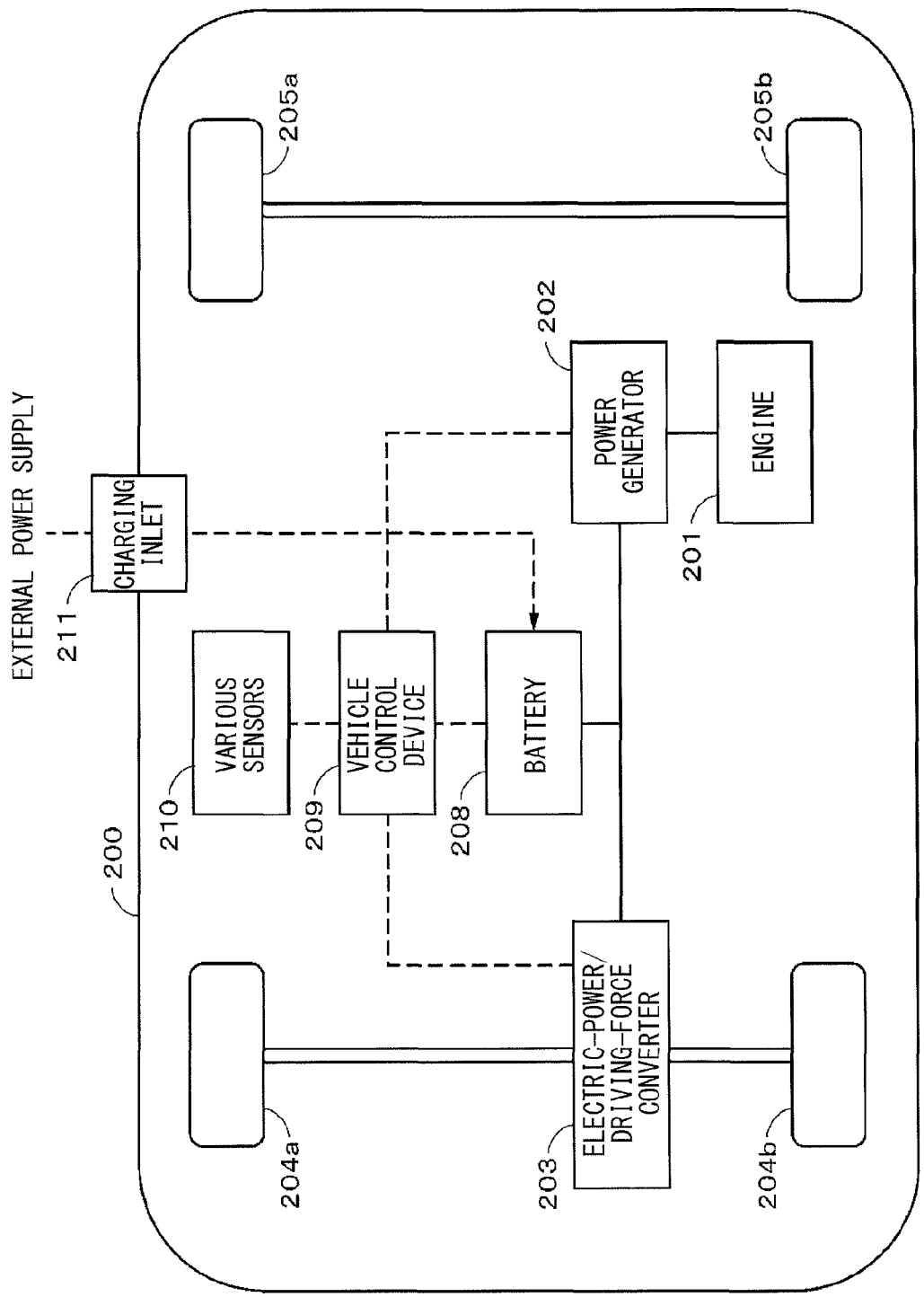
FIG. 17 is a block diagram illustrating a second example of an application of the power supply device according to any of the embodiments of the present disclosure.

An example in which any of the above-described embodiments of the present disclosure is applied to a power storage system for a vehicle will be described with reference to FIG. 17. FIG. 17 schematically illustrates an example of a configuration of a hybrid vehicle (a hybrid vehicle 200) adopting a series hybrid system to which any of the above-described embodiments of the present disclosure is applied. The vehicle adopting the series hybrid system runs with an electric-power/driving-force converter, through use of electric power generated by a generator operated by an engine, or the electric power after being temporarily stored in a battery.

The hybrid vehicle 200 is provided with an engine 201, a power generator 202, an electric-power/driving-force converter 203, a driving wheel 204a, a driving wheel 204b, a wheel 205a, a wheel 205b, a battery 208, a vehicle control device 209, various sensors 210, and a charging inlet 211. The power supply device according to any of the above-described embodiments of the present disclosure is applied to a charging device of the battery 208.

The hybrid vehicle 200 runs using the electric-power/driving-force converter 203 as a power supply. Examples of the electric-power/driving-force converter 203 may include a motor. The electric-power/driving-force converter 203 operates using electric power of the battery 208, and torque of the electric-power/driving-force converter 203 is transmitted to the driving wheels 204a and 204b. It is to be noted that, through use of DC-to-AC conversion or reverse conversion (AC-to-DC conversion) at a necessary point, either an AC motor or a DC motor is applicable as the electric-power/driving-force converter 203. The various sensors 210 are used for control of an engine speed and opening level of a not-illustrated throttle valve (throttle opening level) through the vehicle control device 209. The various sensors 210 include sensors such as a velocity sensor, an acceleration sensor, and an engine speed sensor.

The torque of the engine 201 is transmitted to the generator 202, and electric power generated by the generator 202 through use of the torque is allowed to be stored in the battery 208.

When the speed of the hybrid vehicle is reduced by a control mechanism (not illustrated), resistance at the time of the reduction in the speed is added to the electric-power/driving-force converter 203 as torque, and regenerative electric power generated by the electric-power/driving-force converter 203 using this torque is stored in the battery 208.

The battery 208 may also be able to receive electric power from an external power supply through the charging inlet 211 serving as an input port, and store the received electric power, by being connected to the external power supply that is provided outside the hybrid vehicle.

An information processing device that performs information processing for vehicle control based on information about a secondary battery may be provided, although it is not illustrated. Examples of such an information processing device may include an information processing device that displays a remaining capacity of the battery based on information about the remaining capacity of the battery.

It is to be noted that the series hybrid vehicle that runs with the motor using the electric power generated by the generator operated by the engine, or the electric power temporarily stored in the battery has been described above as an example. However, any of the above-described embodiments of the present disclosure is effectively applicable to a parallel hybrid vehicle that uses an output of either the engine or the motor as a driving supply, and uses three systems of running with only the engine, running with only the motor, and running with the engine and the motor, by switching therebetween as appropriate. Further, any of the above-described embodiments of the present disclosure is also effectively applicable to a so-called electric vehicle that runs through driving using only a drive motor, without using an engine.

It is possible to achieve at least the following configurations from the above-described example embodiments and the modifications of the disclosure.

(1) A power supply device including:
   an input determination section configured to determine which one of a commercial power supply and a power generator is an input power supply, and to generate a determination signal;
   a conversion section of a switching type configured to convert an input voltage into an output voltage; and
   a drive-signal generation section configured to be supplied with determination output from the input determination section, and to generate a switching drive signal for the conversion section,
   the drive-signal generation section being configured to serve as a power-factor correction control section and to generate the switching drive signal when the determination signal indicates that the commercial power supply is the input power supply, and
   the drive-signal generation section being configured to serve as a maximum power point tracking control section and to generate the switching drive signal when the determination signal indicates that the power generator is the input power supply.

(2) The power supply device according to (1), wherein the input voltage is an output voltage of a full-wave rectifier circuit.

(3) The power supply device according to (2), wherein the input determination section generates the determination signal based on variation with time in the output voltage of the full-wave rectifier circuit.

(4) The power supply device according to (3), wherein the input determination section determines whether or not the commercial power supply is the input power supply, through comparing an output waveform of the full-wave rectifier circuit with a sinusoidal waveform.

(5) The power supply device according to any one of (1) to (4), wherein the power generator is a solar battery.

(6) The power supply device according to any one of (1) to (5), wherein the maximum power point tracking control section tracks a maximum power point by hill-climbing control.

(7) An electrical storage device including:
   an input determination section configured to determine which one of a commercial power supply and a power generator is an input power supply, and to generate a determination signal;
   a conversion section of a switching type configured to convert an input voltage into an output voltage; and
   a drive-signal generation section configured to be supplied with determination output from the input determination section, and to generate a switching drive signal for the conversion section,
   the drive-signal generation section being configured to serve as a power-factor correction control section and to generate the switching drive signal when the determination signal indicates that the commercial power supply is the input power supply, and
   the drive-signal generation section being configured to serve as a maximum power point tracking control section and to generate the switching drive signal when the determination signal indicates that the power generator is the input power supply; and
   an electrical storage section configured to serve as a load.

(8) The electrical storage device according to (7), wherein the input voltage is an output voltage of a full-wave rectifier circuit.

(9) An electric vehicle including
   an electrical storage device including
   an input determination section configured to determine which one of a commercial power supply and a power generator is an input power supply, and to generate a determination signal,
   a conversion section of a switching type configured to convert an input voltage into an output voltage, and
   a drive-signal generation section configured to be supplied with determination output from the input determination section, and to generate a switching drive signal for the conversion section,
   the drive-signal generation section being configured to serve as a power-factor correction control section and to generate the switching drive signal when the determination signal indicates that the commercial power supply is the input power supply, and
   the drive-signal generation section being configured to serve as a maximum power point tracking control section and to generate the switching drive signal when the determination signal indicates that the power generator is the input power supply, and
   an electrical storage section configured to serve as a load.

(10) An electric power system including
   an electrical storage device including
   an input determination section configured to determine which one of a commercial power supply and a power generator is an input power supply, and to generate a determination signal,
   a conversion section of a switching type configured to convert an input voltage into an output voltage, and
   a drive-signal generation section configured to be supplied with determination output from the input determination section, and to generate a switching drive signal for the conversion section,
   the drive-signal generation section being configured to serve as a power-factor correction control section and to generate the switching drive signal when the determination signal indicates that the commercial power supply is the input power supply, and
   the drive-signal generation section being configured to serve as a maximum power point tracking control section and to generate the switching drive signal when the determination signal indicates that the power generator is the input power supply, and an electrical storage section configured to serve as a load.

[8. Modifications]

Some embodiments of the present disclosure have been specifically described above, but various modifications based on technical ideas of the present disclosure are possible without being limited to the above-described embodiments. For example, the configurations, methods, processes, shapes, materials, and numerical values described above in the embodiments are mere examples, and other configuration, method, process, shape, material, and numerical value may be adopted as necessary.

Further, any combinations of the configurations, methods, processes, shapes, materials, and numerical values described above in the embodiments are allowed without deviating from the spirit of the present disclosure.

It should be understood by those skilled in the art that various modifications, combinations, sub-combinations, and alterations may occur depending on design requirements and other factors insofar as they are within the scope of the appended claims or the equivalents thereof

What is claimed is:

1. A power supply device comprising:
   an input determination section configured to determine which one of a commercial power supply and a power generator is an input power supply, and generate a determination signal,
   wherein the input determination section is configured to receive, as an input voltage, an output voltage of a full-wave rectifier circuit and generate the determination signal based on variation with time in the received output voltage,
   wherein the input determination section is configured to determine the input power supply to be the commercial power supply, in case of a time period T1 in which the received output voltage is varied from 0 to peak voltage and a time period T2 in which the received output voltage is varied from peak voltage to 0 is equal;
   a conversion section of a switching type configured to convert the input voltage into an output voltage; and
   a drive-signal generation section configured to be supplied with determination output from the input determination section, and generate a switching drive signal for the conversion section,
   the drive-signal generation section configured to serve as a power-factor correction control section and generate the switching drive signal in an event that the determination signal indicates that the commercial power supply is the input power supply, and
   the drive-signal generation section configured to serve as a maximum power point tracking control section and generate the switching drive signal in an event that the determination signal indicates that the power generator is the input power supply.

2. The power supply device according to claim 1, wherein the input voltage is the output voltage of the full-wave rectifier circuit.

3. The power supply device according to claim 1, wherein the input determination section is configured to determine whether or not the commercial power supply is the input power supply, through comparing an output waveform of the full-wave rectifier circuit with a sinusoidal waveform.

4. The power supply device according to claim 1, wherein the power generator is a solar battery.

5. The power supply device according to claim 1, wherein the maximum power point tracking control section is configured to track a maximum power point by hill-climbing control.

6. The power supply device according to claim 1, wherein the input determination section is configured to determine the input power supply to be the commercial power supply, in case of the time period T1 and the time period T2 are equal for two consecutive waveforms of the full-wave rectifier circuit.

7. An electrical storage device comprising:
   an input determination section configured to determine which one of a commercial power supply and a power generator is an input power supply, and generate a determination signal,
   wherein the input determination section is configured to receive, as an input voltage, an output voltage of a full-wave rectifier circuit and generate the determination signal based on variation with time in the received output voltage,
   and wherein the input determination section is configured to determine the input power supply to be the commercial power supply, in case of a time period T1 in which the received output voltage is varied form 0 to peak voltage and a time period T2 in which the received output voltage is varied from peak voltage to 0 is equal;
   a conversion section of a switching type configured to convert the input voltage into an output voltage; and
   a drive-signal generation section configured to be supplied with determination output from the input determination section, and generate a switching drive signal for the conversion section,
   the drive-signal generation section configured to serve as a power-factor correction control section and generate the switching drive signal in an event that the determination signal indicates that the commercial power supply is the input power supply, and
   the drive-signal generation section configured to serve as a maximum power point tracking control section and generate the switching drive signal in an event that the determination signal indicates that the power generator is the input power supply; and
   an electrical storage section configured to serve as a load.

8. The electrical storage device according to claim 7, wherein the input voltage is the output voltage of the full-wave rectifier circuit.

9. An electric vehicle comprising:
   an electrical storage device including:
   an input determination section configured to determine which one of a commercial power supply and a power generator is an input power supply, and generate a determination signal,
   wherein the input determination section is configured to receive, as an input voltage, an output voltage of a full-wave rectifier circuit and generate the determination signal based on variation with time in the received output voltage,
   and wherein the input determination section is configured to determine the input power supply to be the commercial power supply, in case of a time period T1 in which the received output voltage is varied form 0 to peak voltage and a time period T2 in which the received output voltage is varied from peak voltage to 0 is equal;
   a conversion section of a switching type configured to convert the input voltage into an output voltage, and a drive-signal generation section configured to be supplied with determination output from the input determination section, and generate a switching drive signal for the conversion section, the drive-signal generation section configured to serve as a power-factor correction control section and generate the switching drive signal in an event that the determination signal indicates that the commercial power supply is the input power supply, and the drive-signal generation section configured to serve as a maximum power point tracking control section and generate the switching drive signal in an event that the determination signal indicates that the power generator is the input power supply, and an electrical storage section configured to serve as a load.

10. An electric power system comprising:

an electrical storage device including:

an input determination section configured to determine which one of a commercial power supply and a power generator is an input power supply, and generate a determination signal, wherein the input determination section is configured to receive, as an input voltage, an output voltage of a full-wave rectifier circuit and generate the determination signal based on variation with time in the received output voltage, and wherein the input determination section is configured to determine the input power supply to be the commercial power supply, in case of a time period T1 in which the received output voltage is varied form 0 to peak voltage and a time period T2 in which the received output voltage is varied from peak voltage to 0 is equal;

a conversion section of a switching type configured to convert the input voltage into an output voltage, and a drive-signal generation section configured to be supplied with the determination output from the input determination section, and generate a switching drive signal for the conversion section, the drive-signal generation section configured to serve as a power-factor correction control section and generate the switching drive signal in an event that the determination signal indicates that the commercial power supply is the input power supply, and the drive-signal generation section configured to serve as a maximum power point tracking control section and generate the switching drive signal in an event that the determination signal indicates that the power generator is the input power supply, and an electrical storage section configured to serve as a load.

* * * * *